United States Patent [19]

Forestieri et al.

[11] Patent Number: 5,394,874
[45] Date of Patent: Mar. 7, 1995

[54] ANGIOGRAPHY USING ULTRASOUND

[75] Inventors: Steven F. Forestieri, Santa Clara; Ray S. Spratt, San Jose, both of Calif.

[73] Assignee: Diasonics Ultrasound, Inc., Milpitas, Calif.

[21] Appl. No.: 178,766

[22] Filed: Jan. 7, 1994

Related U.S. Application Data

[63] Continuation-in-part of Ser. No. 9,279, Jan. 26, 1993, Pat. No. 5,299,174, which is a continuation-in-part of Ser. No. 867,038, Apr. 10, 1992, Pat. No. 5,228,009.

[51] Int. Cl.$^6$ .............................................. A61B 8/06
[52] U.S. Cl. ........................... 128/660.05; 128/661.09
[58] Field of Search ..................... 128/660.05, 661.09

[56] References Cited

U.S. PATENT DOCUMENTS

| | | | |
|---|---|---|---|
| 5,058,593 | 10/1991 | Forestieri et al. | 128/661.09 |
| 5,224,481 | 7/1993 | Ishihara et al. | 128/660.07 |
| 5,228,009 | 7/1993 | Forestieri et al. | 128/661.09 |
| 5,233,993 | 8/1993 | Kawano | 128/661.01 X |
| 5,279,302 | 1/1994 | Tamano et al. | 128/661.09 |
| 5,282,471 | 2/1994 | Sato | 128/660.07 |
| 5,299,174 | 3/1994 | Forestieri et al. | 128/661.09 |
| 5,315,512 | 5/1994 | Roth | 128/660.07 X |
| 5,325,859 | 7/1994 | Ishihara et al. | 128/660.07 |
| 5,329,929 | 7/1994 | Sato et al. | 128/661.09 |

Primary Examiner—Francis Jaworski
Attorney, Agent, or Firm—Blakely, Sokoloff, Taylor & Zafman

[57] ABSTRACT

Method and apparatus for performing angiography of a subject under examination in an ultrasonic imaging apparatus. A set of ultrasonic reference pulses along each of a series of parallel vectors is emitted into the subject under examination, echoes are received, and a plurality of data samples are obtained. From each of the plurality of data samples a plurality of basis functions are removed to remove clutter and generate a plurality of processed samples. The processed samples are averaged and temporally filtered with signals displayed in a previous time period to generate a second averaged signals. The temporal filtering is performed using a filter coefficient which approximates a full cardiac cycle of the subject under examination. Each of the second plurality of signals is converted to a color value to generate a first plurality of color values within a range of color values from the first color value to a second color value, wherein the first color value represents a minimum amplitude of the third plurality of signals to be displayed and the second color value represents a maximum amplitude of the second plurality of signals to be displayed. The first plurality of color values is displayed on the display at positions on the display corresponding with the points (color sample volumes) along each of the series of parallel vectors in the subject.

7 Claims, 6 Drawing Sheets

ANGIOGRAPHY USING ULTRASOUND

CROSS-REFERENCE TO RELATED APPLICATIONS

This application is a continuation-in-part of U.S. patent application Ser. No. 08/009,279 filed Jan. 26, 1993, which is now U.S. Pat. No. 5,299,174, which is a continuation-in-part of U.S. patent application Ser. No. 07/867,038, filed Apr. 10, 1992, which is now U.S. Pat. No. 5,228,009.

BACKGROUND OF THE INVENTION

1. Field of the Invention

The present invention relates to ultrasonic imaging apparatus. More specifically, the present invention relates to an ultrasonic imaging apparatus which is used for imaging blood vessels of a subject.

2. Background Information

Angiography, or the mapping of blood vessels within subjects under examination, has been performed with a number of apparatus in prior art techniques. Typically, angiography in prior art applications have been performed with invasive techniques such as x-ray angiography, nuclear medicine, or surgery. For example, some prior art techniques of angiography are performed by injecting an x-ray opaque dye into a subject under examination allowing a period of time to transpire so that the dye becomes circulated within the blood stream of the subject and exposing the subject to ionizing radiation (e.g., x-rays) in order to image blood vessels in the subject. This is known as contrast injections. Other passive noninvasive techniques such as magnetic resonance imaging (MRI) may also be used. Of course, such techniques suffer from many disadvantages. For example, x-ray techniques require that the subject be exposed to ionizing radiation, which may be undesirable in certain circumstances, such as during pregnancy or where exposure to radiation is otherwise desired to be avoided. Techniques such as MRI require that the subject remain still for an extended duration and require the use of very expensive apparatus. Thus, them is needed a methodology to allow angiography without disadvantages of prior art, such as the use of invasive techniques such as x-ray angiography, nuclear medicine, or surgery.

Pulse echo ultrasonic imaging technology is one typically used for examining the internal structure of living organisms, such as blood flow. In the diagnosis of various medical conditions, it is often useful to examine soft tissues and/or blood flow within the body to show structural details of organs and blood vessels in these organs. Experienced clinicians can use this information in diagnosing various pathologies.

To examine internal body structures, ultrasonic images are formed by producing very short pulses of ultrasound using a transducer, sending the pulses through the body, and measuring the properties of the echoes (e.g., amplitude and phase) from targets at varying depths within the body. Typically, the ultrasound beam is focused at various depths within the body in order to improve resolution or image quality. The echoes are received by a transducer, typically, the same transducer used for transmission and process to generate an image of an object, usually referred to as a B-scan image.

Measuring and imaging blood flow (or other fluid flow) in the human body is typically done using the Doppler principle, wherein a transmitted burst of ultrasound at a specific frequency is reflected from moving blood cells thereby changing the frequency of the reflected ultrasound in accordance with the velocity and direction of the flow.

The frequency shift of the reflected signals with respect to the transmitted signals may be detected, and since the amount of shift (or the Doppler shift) is proportional to the blood flow velocity, it may be used to display velocity information of blood flow on a video screen for imaging a living patient. However, typical prior art color Doppler imaging has been unsatisfactory for performing angiography because it displays velocity information, whereas, angiography requires information be displayed which is direction, angle, and velocity-independent. Moreover, angiography requires high contrast between tissue and blood vessels in a subject to determine the location of blood vessels. In prior art Doppler color imaging, the flow displayed upon the display was shown in relation to its movement towards or away from the probe, typically represented in distinguishing colors, such as red and blue (reflecting the red and blue shift of the Doppler signal data due to movement to or away from the transducer). However, such information is unneeded in angiography, which seeks to merely display blood vessels within a living organism. In addition, the prior art aliases the image making blood vessels look inhomogenous or discontinuous. The prior art is also limited in that noise in an ultrasonic imaging system appears to be flow.

Thus, it is desired to use ultrasonic imaging for performing angiography in living subjects, however, prior art systems have been inadequate for this application.

SUMMARY AND OBJECTS OF THE INVENTION

One of the objects of the present invention is to provide a means for angiography without invasive techniques.

Another of the objects of the present invention is to provide a means for performing angiography using ultrasound.

Another of the objects of the present invention is to provide a means for increasing the sensitivity of ultrasonic apparatus to detect blood flow in a living organism which is direction, velocity, and angle-independent.

Another of the objects of the present invention is to provide a means for imaging blood vessels within internal organs and other structures within an organism without invasive techniques.

These and other objects of the present invention are provided for by a method and apparatus for performing angiography of a subject under examination in an ultrasonic imaging apparatus which includes an ultrasonic emitter, a receiver, a processor, and a display. Using the ultrasonic emitter, a set of ultrasonic reference pulses along each of a series of parallel vectors is emitted into the subject under examination. Using the receiver, each of a plurality of echo signals generated by a reflection of the ultrasonic reference pulses in the subject under examination are received. For each of the plurality of received echo signals, a plurality of data samples from the plurality of received echo signals are obtained, each of the data samples representing points along each of the series of parallel vectors in the subject (such as color sample volumes), the plurality of data samples each including a frequency shift from each of the set of ultrasonic reference pulses. From each of the plurality of data samples a plurality of basis functions are removed to remove clutter and generate a plurality of samples. The average power (e.g., $R_{0lo}$ from Applicant's grandparent application, now U.S. Pat. No. 5,228,009) from each of the plurality of samples is temporally filtered with each of a plurality of signals which have been displayed in a previous time period to generate a plurality of second signals. The temporal filtering is performed using a filter coefficient which approximates a full cardiac cycle of the subject under examination. Thus, although pulsatility information is eliminated, dynamic range and the signal-to-noise ratio (SNR) is increased dramatically. Each of the second signals is converted to a color value to generate a first plurality of color values. Each of the color value of the first plurality of color values is within a range of color values from the first color value to a second color value, wherein the first color value represents a minimum amplitude of the second signals to be displayed and the second color value represents a maximum amplitude of the second signals to be displayed. The first color represents noise in the system, and the second color represents flow. Then, the first plurality of color values is displayed on the display at positions on the display corresponding with the points (color sample volumes) along each of the series of parallel vectors in the subject.

Other features, objects, and advantages of the present will become apparent from viewing the figures and the description which follows below.

BRIEF DESCRIPTION OF THE DRAWINGS

The present invention is illustrated by way of example and not limitation in the figures of the accompanying in which like references indicate like elements and in which.

DETAILED DESCRIPTION

Various embodiments of the present invention are directed towards an apparatus and method for performing angiographic studies within living organisms using an ultrasonic imaging system. In the following description, numerous specific details are set forth, such as specific hardware and components, signals, method steps, etc., in order to provide a thorough understanding of the present invention. It will be obvious, however, to one skilled in the art that these specific details may not be required to practice the present invention. In other instances, well-known components have not been described in detail in order to not unnecessarily obscure the present invention.

Figure 1:
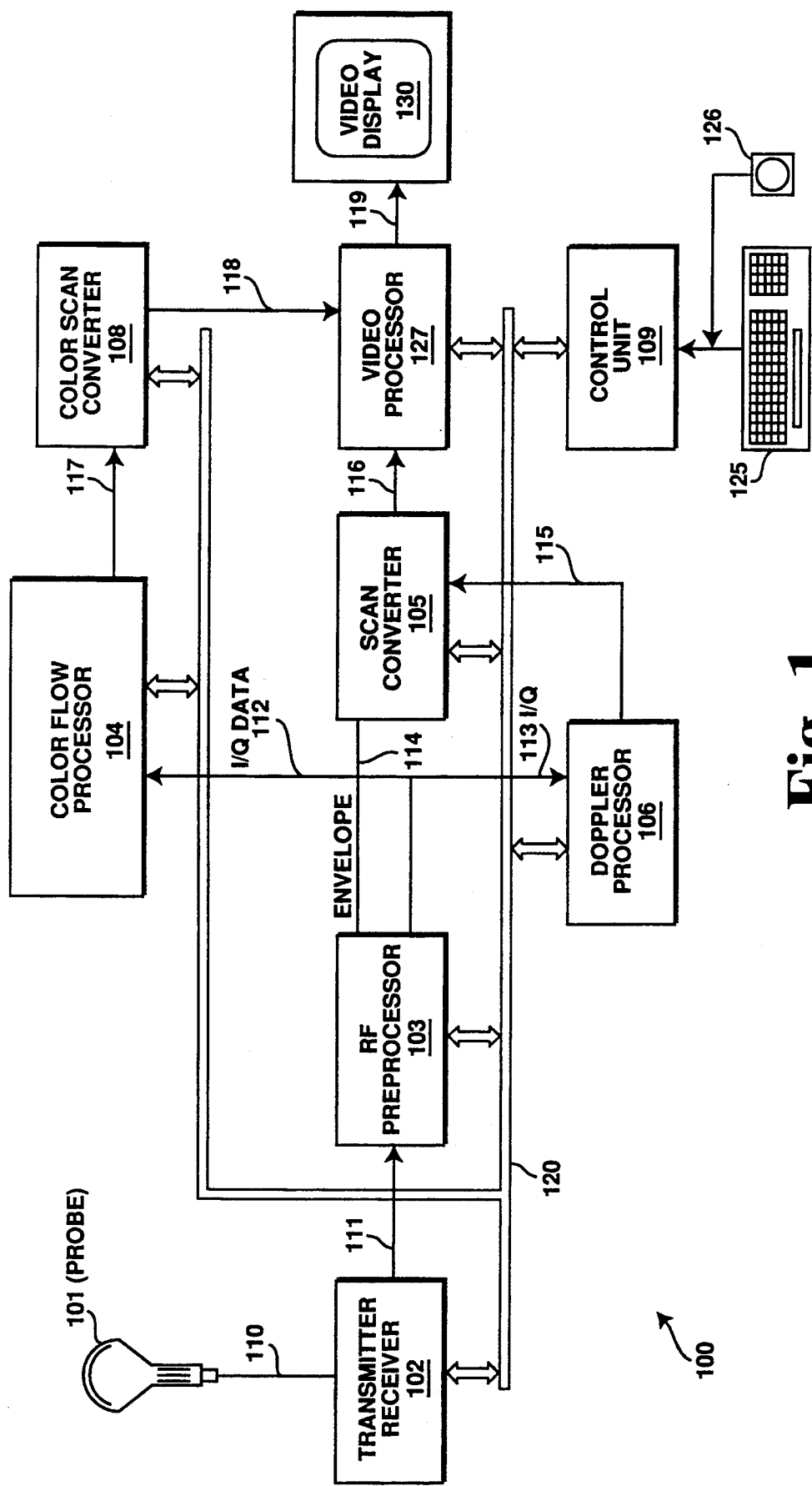
FIG. 1 shows an apparatus in which various embodiments of the present invention may be implemented.

One embodiment of the present invention resides in a typical prior art ultrasonic imaging system, such as illustrated in FIG. 1. Color flow processor 104 illustrated in FIG. 1 may include a programmable color flow processor comprising a plurality of Digital Signal Processors (DSP's) and associated circuitry, such as described in Applicant's prior U.S. Pat. No. 5,058,593. Various embodiments of the present invention may be implemented in discrete hardware components or, alternatively, in programmed processing units such as digital signal processors using software which is compiled and linked and loaded from disk space storage for execution at run-time. Various programs containing the methods employed in these embodiments may also reside in firmware components or other similar nonvolatile storage means.

For example, a typical ultrasound system for color Doppler imaging is shown in FIG. 1 as imaging system 100. Imaging system 100 generally comprises a probe 101, which is typically a multi-element array of one hundred or more piezoelectric elements which both send and receive ultrasound signals when examining the human body. Probe 101 is coupled via signal path 110 to transmitter/receiver circuitry 102, which is designed according to principles well known in the ultrasound imaging art and for purposes of brevity will not be discussed in detail here.

Transmitter/receiver circuitry 102 is coupled to a control unit 109 via bus 120 and is controlled so that the elements in probe 101 are focusing at particular points in the body, both on transmit and receive. Transmitter/receiver circuitry 102 and control unit 109 also often provide a scanning function such that a two dimensional image may be generated without moving probe 101 with respect to the body.

Following transmission of ultrasound signals into the body, reflected signals are processed by a receiver (which is typically known as a beamformer) in transmitter/receiver circuitry 102 and the multitude of signals from each individual element of probe 101 are converted into a single signal which is sent to RF (Radio Frequency) processor 103 via signal path 111.

RF processor 103, also under the control of control unit 109 via bus 120, processes the signal information to produce a detected and unipolar envelope signal and in-phase (I) and quadrature (Q) Doppler signals. The envelope signal represents the amplitude of echoes returning from the body and is further transmitted via signal path 114 to a scan converter 105 which is a typically a large electronic memory, also well known in the art.

Scan converter 105, also under the control of control unit 109 via bus 120, stores the envelope echo information on a line by line basis together with the geometrical position of such information in the body resulting from the scanning process, in such a manner that a two-dimensional video image may be constructed and transmitted to video processor 127 via signal path 116. Video processor 127 is also under the control of control unit 109 via bus 120.

In the absence of any color Doppler information, video processor simply sends a conventional video signal over signal path 119 to video display monitor 130. This two-dimensional image, usually black and white, represents the distribution of echo generating sites within the body. The so-called B-scan image is thus used by the operator to search the body for pathology or by the physician in developing a diagnosis.

I and Q signals for so-called single-gate Doppler are sent to Doppler processor 106 via signal path 113. Doppler processor 106, under the control of control unit 109 via bus 120, using signal processing methods well known in the art, compares signals from several successive echoes to determine the Doppler shift in a single region in the body which is commonly known as the sample volume. Doppler processor 106 also typically produces a continuous time series of spectral Doppler information in which blood flow velocities are displayed in black and white on video display 130 over one or more cardiac cycles (typically several seconds), having first been sent to scan converter 105 via signal path 115, to video processor 127 via signal path 116 and to video display 130 over signal path 119.

Finally, the third path to video display 130 is the color Doppler path in which various embodiments of the present invention may effect the signal, as discussed below.

RF processor 103 transmits I and Q signals via signal path 112 to color flow processor 104 which is also controlled by control unit 109 via bus 120. Color flow processor 104 typically processes several Doppler sample volumes along a given scanning direction in the body. Details of prior an color flow processing will be discussed below.

Color flow processor passes signals to color scan converter 108, also under the control of control unit 109 via bus 120, via signal path 117 where, in a manner similar to the black and white scan converter 105, color encoded signals are stored on a line by line basis, together with the geometrical position of such information in the body resulting from the scanning process, in such a manner that a two-dimensional color video image may be constructed and transmitted to video processor 127 via signal path 118.

Color scan converter 108, which may also be used to interpolate scan line information obtained from color flow processor 104, then transmits color Doppler information via signal path 118 to video processor 127 for display on video display 130. Video processor 127 typically includes so-called decision circuits to choose whether a given specific part of the two dimensional image has color information resulting from flow or whether it only has echo information from static tissue. If flow is present, the color information is displayed at the correct point in the image rather than the black and white image information.

Although a system as illustrated in FIG. 1 with the improved color flow processor described in Applicant's prior U.S. Pat. No. 5,058,593 has been previously used for Doppler color imaging in a living subject, the present invention is directed towards angiography, or mapping of blood vessels, including "perfusion" (the flow of blood within tissue). Thus, the velocity and direction of such flow information is irrelevant, and instead, is displayed in an angle, direction, and velocity-independent amplitude or power-only mode so that mappings of blood vessels in internal organs and other structures within a living subject may be performed.

Figure 2:
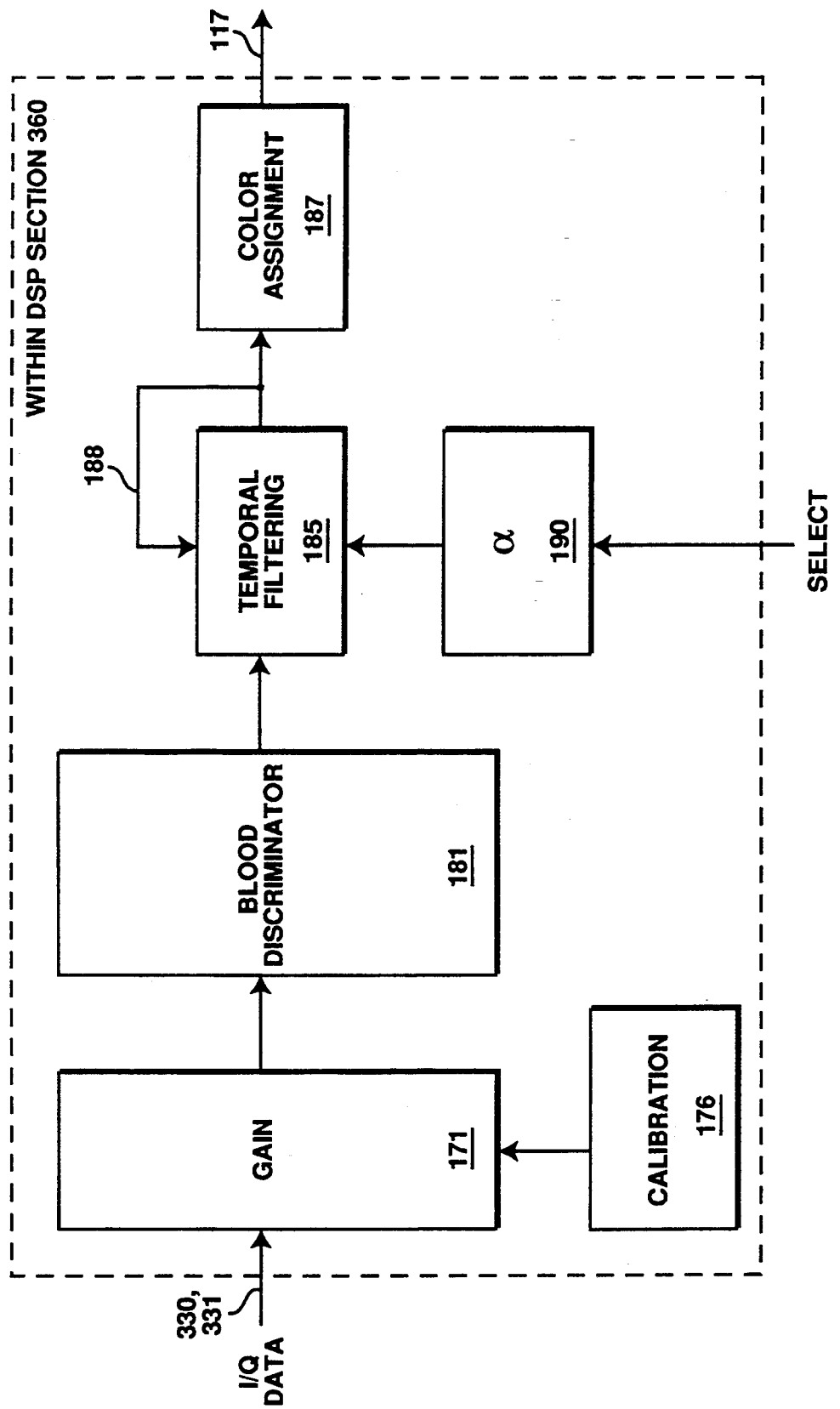
FIG. 2 shows a functional block diagram of circuitry for angiography using one embodiment of the present invention.

A functional block diagram of one embodiment of the present invention implemented in color flow processor 104 of FIG. 1 is illustrated in FIG. 2. Each of the blocks may be viewed as functions and/or dedicated circuitry within the color flow processor 104 and generally implemented using a combination of existing hardware within the color flow processor and executable routines which are loaded from nonvolatile storage into volatile memory and executed at run-time. Note that there are parallel signal paths 330 and 331 for both the in-phase (I) and quadrature (Q) information which is input to DSP section 260 of color flow processor 104 (described in U.S. Pat. No. 5,058,593), which have been digitally sampled from analog signal path 112. Essentially, circuitry is identical for the two signals paths prior to processing by digital signal processors such as those shown in DSP section 260 of U.S. Pat. No. 5,058,593. At any rate, the two signal paths 112 proceed to gain circuit 171 illustrated in FIG. 2a which increases the amplitude of the digital signals on lines 330 and 331. In one embodiment of the present invention, the gain applied to the input I and Q signals is precalibrated prior to system operation time so that what would otherwise be noise in a prior art Doppler ultrasonic imaging system is, in fact, eventually assigned to a first color value in the apparatus. After being adjusted by gain circuit 171, then the I and Q data are passed to a circuit for blood discrimination 181. Blood discriminator 181 discriminates blood from tissue in the living organism. In one embodiment of the present invention, blood discrimination is performed using Applicant's grandparent application, now U.S. Pat. No. 5,228,009. In addition, an automatic clutter elimination technique may be used for this device. One said device was described in Applicant's parent patent application Ser. No. 08/009,279, filed Jan. 26, 1993, now U.S. Pat. No. 5,299,174. As described in these patents, successive basis functions are removed from the I and Q signal data until to a maximum preset number of basis functions have been removed. The number of basis functions removed is specified by the user to increase the quality of the I and Q signal data. Each basis function removed successively removes clutter. Using these techniques, first, a constant term is removed from each of the I and Q data for each color sample volume. Then, for each color sample volume, a linear term is removed from the input I and Q signals. This continues until the highest order basis function selected by a user has been removed from the I and Q data. Note that, in alternative embodiments, the number of basis functions removed from the signals may be variable depending upon certain factors. This may include assumptions regarding the improvement of the signal due to the removal of each basis function. In other words, if the signal does not improve a specified amount after the removal of one basis function, then the result of removing that basis function from the signal is reversed, and the processing of the signal is deemed complete.

Once blood has been discriminated by block 181, the average power $R_{01o}$ is passed to a temporal filtering circuit 185. Temporal filtering is performed using a user-selectable filter coefficient α 190 illustrated in FIG. 2, and a previous signal value which is returned to temporal filter circuit 185 via a signal path such as 188 illustrated in FIG. 2. Using a typical prior art technique, temporal filtering may be performed upon a current signal $x_n$ received from blood discriminator 181 to determine a current filtered value $y_n$, in the following manner:

$$y_n = \alpha y_{n-1} + (1-\alpha)x_n$$

wherein $y_{n-1}$ is the previous data and $x_n$ is the input signal and $0 \leq \alpha \leq 1$.

In contrast to prior art systems which use small magnitudes of α for the temporal filter, implemented embodiments of the present invention use very large values of α so that displayed signals for each sample volume on the display have long persistence. Using large values of α for a temporal filter means that the filter's coefficient approximates the cardiac cycle of a subject. In contrast to temporally filtered Doppler flow information which is typically displayed upon a display such as 130 illustrated in FIG. 1, these long decay periods increases the signal-to-noise ratio (SNR) and the dynamic range of the eventually displayed signal amplitude information. Prior art Doppler temporal filtering techniques typically use small values of α ranging between 0.125 and 0.375, so that pulsatility of the signal may be maintained. Pulsatility is required to be preserved for accurately displaying flow for Doppler. In implemented embodiments of the present invention, α ranges between 0.88 and 0.92 so that a high weighting is given to previously displayed signals for the sample volume. Pulsatility information which would normally be displayed is thereby eliminated. This is acceptable because pulsatility is not required for angiographic studies. Implemented embodiments of the present invention therefore heavily filters the signal so that the dynamic range of the signal allows more differentiation between vessels and noise as follows:

new dynamic range (dB)=old dynamic range (dB)+10 log (1−α) The α value is a user-selectable constant depending on the amount of filtering desired by the clinician.

Figure 3:
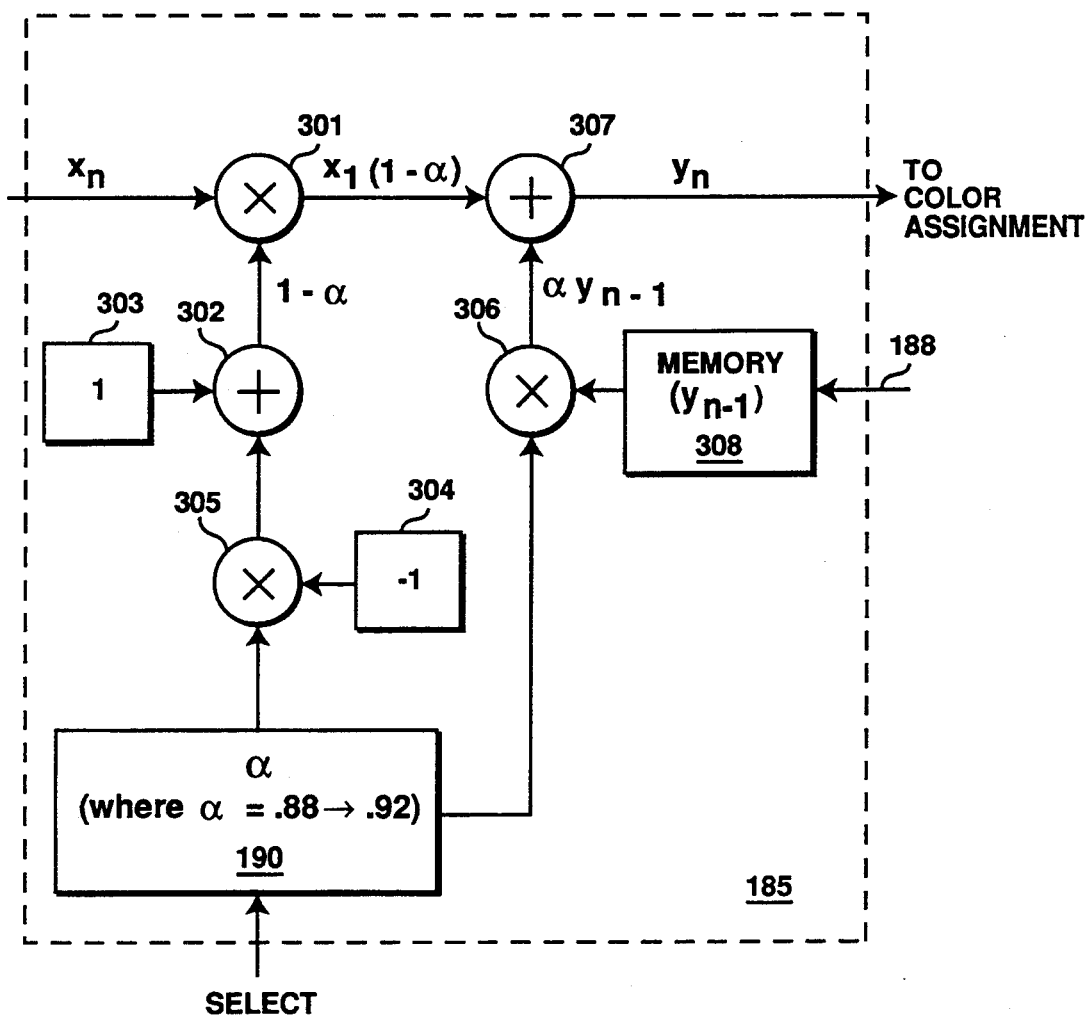
FIG. 3 shows a circuit which may be used for temporal filtering in one embodiment of the present invention.

185 may be implemented in a discrete circuitry, an example of which is illustrated in more detail in FIG. 3. For example, the selected α value may be preset in a volatile storage medium, register, or memory 190 which has been user-selected and loaded. Then, α value 190 may be input to a multiplier or a sign inverter 305 which is then input to a summer 302 to add the sign inverted α value with the value "1" stored in 303 or some other maximum value. It can be appreciated by one skilled in the art, however, that other maximum weighting may be used in various embodiments of the present invention. Then, the input signal $x_n$ and the value $1-\alpha$ are input to a multiplier 301 which then generates the weighted value of the input signal $x_n$ to be used. The α value is further input to a multiplier 306 which also has an input a storage location 308 which contains the previous signal data displayed upon display 130 which has been received from signal path 188 from a previous frame time period. Then, multiplier 306 passes the weighted value $\alpha y_{n-1}$ as an input along with the weighted input signal $x_n(1-\alpha)$ into summer 307 to generate the final result $y_n$. This temporally filtered value $y_n$ is then passed to color assignment block 187 illustrated in FIG. 3.

Finally, circuitry 187 assigns a color value to the signal $y_n$ received from temporal filtering circuit 185. In one embodiment of the present invention, color assignment is performed for a set of colors in a color range from a first color to a second color. The color is assigned based on the amplitude of the signal $y_n$, and the output is generated on signal line 117 using an 8-bit index. A total of 256 different colors is therefore assigned in this embodiment of the present invention. The assignment of colors may be performed by a variety of techniques, however, it is based upon the preassigned noise floor threshold previously discussed and a maximum power level for signals which clearly represent flow, such as in a blood vessel. In one embodiment, this is approximately 20 dB above noise floor. In another embodiment, this may be made variable according to the amount of averaging performed.

Figure 4:
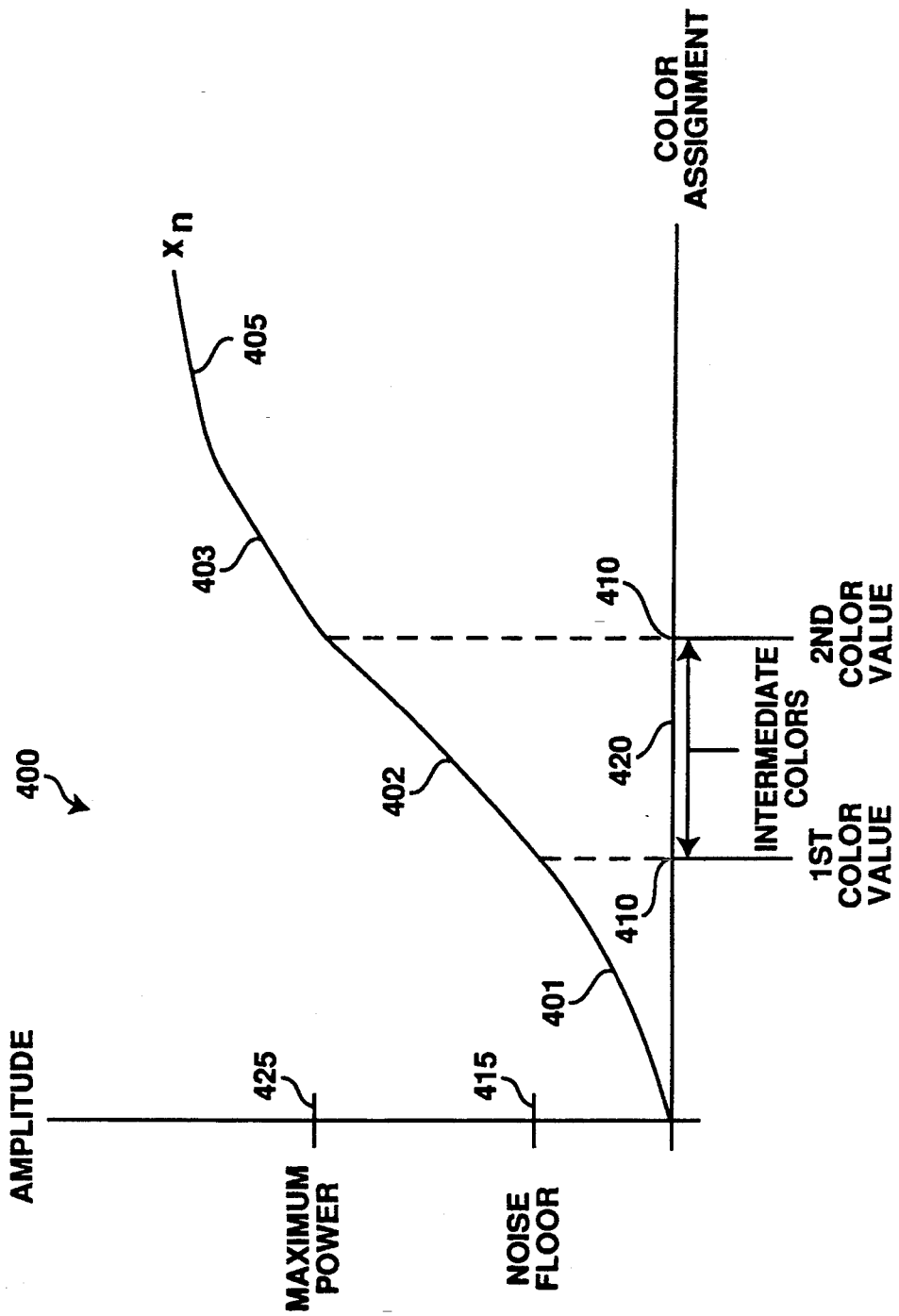
FIG. 4 shows a signal curve and assignments of color values for various amplitudes within the signal curve using one embodiment of the present invention.

Color assignment is performed by assigning colors according to a plot such as 400 shown in FIG. 4, which colors having equal ranges for assignment between the first and second colors. For example, as discussed previously, at a first amplitude value, e.g., 415 of plot 400, all signals equal or in a range of the noise floor will be assigned to a first color value, as is illustrated by 410 in FIG. 4. Thus, any signal on the plot in region 401 shown in FIG. 4 will be assigned to the first color value. In one embodiment of the present invention, the first color value and the second color value causes the power level to be represented as a thermal display upon display 130, wherein the first color value is a light blue color and the second color value is a bright yellow color. Intermediate colors for intermediate amplitudes between the noise floor and the maximum detectable power, as is illustrated at level 425 in FIG. 4, will be assigned to intermediate colors for equal partitions in the color range. The assigned index resides between the first and second color values and represents colors between light blue and bright yellow, in this embodiment. As is illustrated in the plot, therefore, any signals falling in the range of 402 illustrated in FIG. 4 will be assigned to one of the intermediate colors in region 420 of FIG. 4. Any signals reaching the maximum power level or which are greater where flow is clearly present, as is illustrated at 425 in FIG. 4, will be assigned to the second color value. This indicates to the clinician that flow is clearly present in the region, and thus, the presence of blood vessels is clearly indicated by the second color on the display.

Upon completion of processing the signal by color assignment circuitry 187, the signal is then passed to the next block of circuitry in the system, for example, in a prior art apparatus such as 100 illustrated in FIG. 1, to color scan converter 108. Then, the signal for each of the sampled points in the vectors may be displayed upon display 130 illustrated in FIG. 1. Note that, in a typical ultrasonic imaging apparatus, the video display may simultaneously display B-scan information generated by scan converter 105 in FIG. 1 so that the angiogram generated by color flow processor 104 may be overlaid on displayed B-scan data. In another embodiment, a triplex mode may be used for display wherein an angiogram, Doppler, and B-scan image are each displayed simultaneously within. The color ranges for each display mode may be set by the operator to replace B-scan, Doppler or the angiogram with information from another type of display. Note that video processor 127 may implement these techniques using well-known prior art color flow B-scan simultaneous display techniques known in prior art ultrasonic Doppler color imaging systems. Moreover, video processor may cause areas represented in the first color upon display 130 with B-scan information since the first color is that which clearly represents noise or tissue (wherein there is clearly no flow). This is also performed using well-known prior art techniques.

Figure 5:
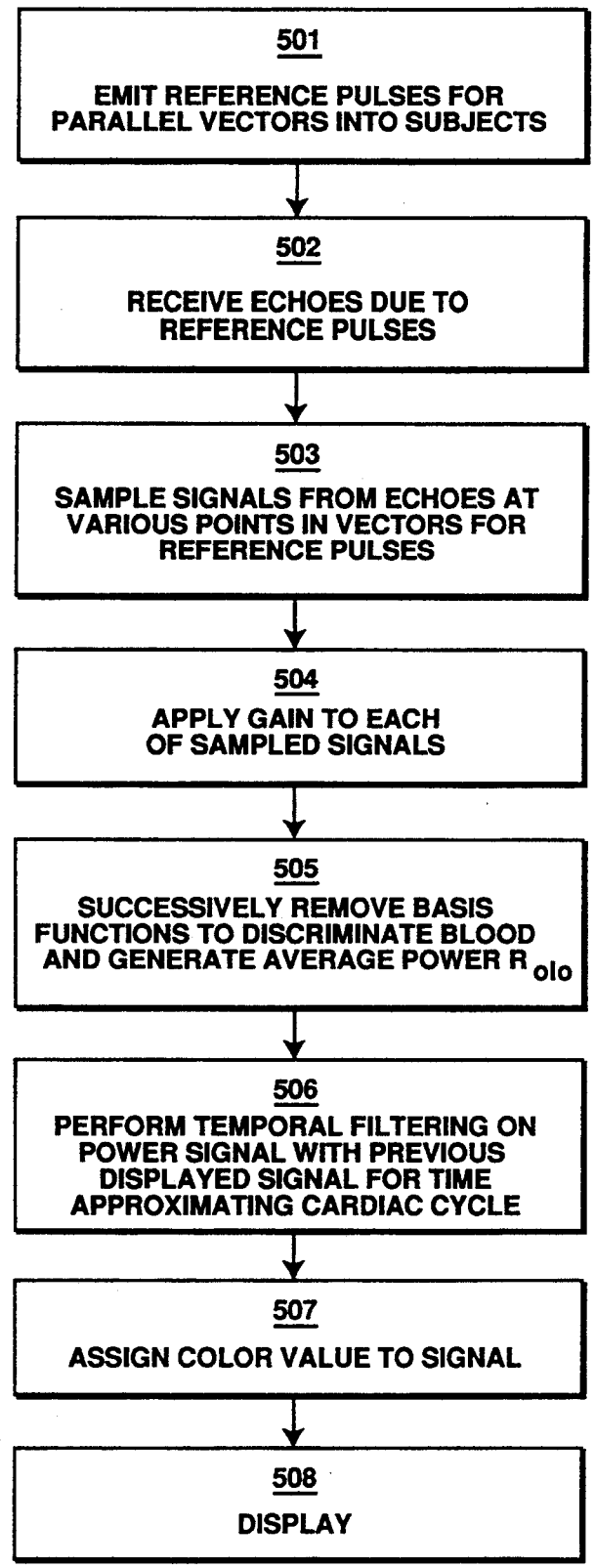
FIG. 5 shows a flowchart of a process 500 which may be used for angiography in one embodiment of the present invention.

A summary of each of the process steps for generating an angiogram of a living subject in a system such as 100 illustrated in FIG. 1 is illustrated with reference to process 500 of FIG. 5, for example, as may be performed in a modified prior art color Doppler ultrasound imaging apparatus. For example, in a subject under examination, a sequence of reference pulses are emitted along a series of parallel vectors in a subject at step 501. This is done using typical prior an Doppler imaging apparatus via a transmitter/receiver 102 and a probe 101, such as those illustrated in FIG. 1. Then, echoes due to the reference pulses are received at step 502 via probe 101 and receiving circuitry and transmitter/receiver 102 illustrated in FIG. 1. Upon receipt of the signals and processing by RF processor 103, color flow processor 104 may sample signals from the echoes at various points in the vectors due to the reference pulses at step 503. This may be done using Applicant's prior U.S. Pat. No. 5,058,593 via analog-to-digital converters shown as 323 in that patent for the in-phase (I) data and similar circuitry for the quadrature (Q) data. Then, at step 504, the preset gain is applied to each of the sampled signals received from the analog-to-digital converters received by DSP's within flow module 104 (e.g., 360 shown in Applicant's prior U.S. Pat. No. 5,058,593) due to the gain preset from the determination of the noise floor. Then, steps 505–507 are applied to each of the sampled signals.

As described above using Applicant's grandparent application, U.S. Pat. No. 5,228,009, successive basis functions are removed from each of the I and Q data at step 505 in order to discriminate blood from tissue in the subject under examination. Then, the average power $R_{01o}$ may be applied to a temporal filter at step 506 using the specific values of $\alpha$ which were discussed above so that the duration in which filtering is applied approximates a cardiac cycle of the subject. Using these very large values of $\alpha$, as already discussed pulsatility information is eliminated, however, the signal-to-noise ratio and the dynamic range of the signal is increased to more highly differentiate blood vessels against noise or other clutter in the system. Then, at step 507, a color value is assigned to the signal depending upon the filtered amplitude information which is received from step 506. Finally, the sampled signals are displayed at step 508 using a typical prior art color scan converter (e.g., 108), video processor (e.g., 127), and video display (e.g., 130), as is typical in prior art color Doppler ultrasonic imaging systems.

In an alternative embodiment, the first color values discussed above may be further processed with the B-scan information replacing all first color values on the display (which we know represents the noise floor in the system, and thus no flow information signal data) with the B-scan information so that additional distracting information may be removed from the display for the clinician. This allows the clinician to further discriminate blood vessels against noise in the system. This may, again, be performed by using well-known techniques, such as via a video processor 127 illustrated in FIG. 1.

Figure 6:
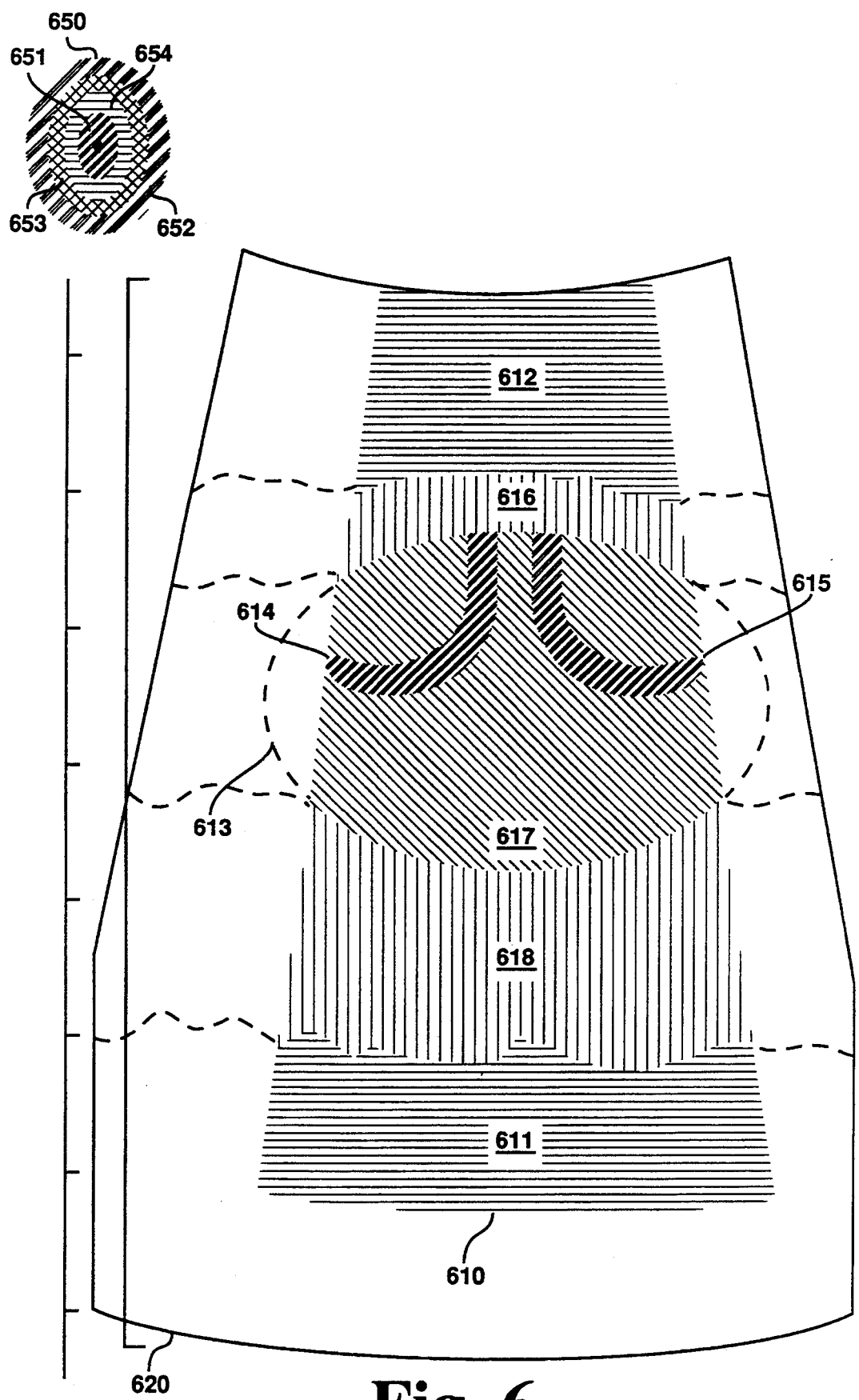
FIG. 6 shows a display which has been generated using one embodiment of the present invention.

The resulting display, for instance, for renal cortical blood flow within a live human subject under examination, is illustrated with reference to FIG. 6. For instance, the display in region of interest 610 in FIG. 6 appears as it would otherwise appear on a color Doppler flow imaging mode, however, the colors are displayed according to the thermal map represented on polar coordinate plot 650 of FIG. 6. For example, the first color value is represented in the region 651 (near the origin) of polar coordinate plot 650 which shows little or no amplitude information above the noise floor in the system. This color may be illustrated using color 611 and 612 in the region of interest indicating no blood flow, such as tissue noise or other non-flow information in the subject. Moreover, the second color may be represented on the polar coordinate plot at a maximum amplitude on the display (e.g., at maximum radius 652 on polar coordinate plot 650) and also is represented in region of interest 610 at regions 614 and 615, clearly illustrating blood vessels within the human liver. The remaining colors illustrated in FIG. 6, such as those shown in region 616, 617, and 618 of region of interest 610 are displayed using intermediate colors on the polar coordinate plot, such as 653 and 654 which allow the clinician to determine whether those colors, in fact, also represent flow within blood vessels on the angiogram. Because only power is represented on the display illustrated in FIG. 6, regions of flow and little or no flow are shown in detail thus allowing blood vessels to be distinguished from tissue or other non-flow objects on the display. Moreover, because the display is filtered heavily from frame to frame over a cardiac cycle of the subject, the colors have a long persistence, and, although pulsatility information has been removed, the power information remains allowing the clinician to distinguish highly differentiated blood vessels from tissue in the subject. This power information also is angle, direction, and velocity-independent and is very sensitive to flow due to high gains and heavy filtering applied to the signal.

Thus, this information provides superior advantages over prior art ultrasound techniques for performing angiography and, moreover, provides advantages over prior art invasive techniques and noninvasive techniques using ionizing radiation, such as contrast injection techniques employing x-rays. Note also that the polar coordinate display is similar to the amplitude-only map disclosed in Applicant's prior U.S. Pat. No. 5,123,417, of Jun. 23, 1992, however, the colors do not vary in brightness radially around the polar coordinate plot but, instead, remain constant at all angles with respect to an origin vector on the polar coordinate plot. Also, it can be appreciated that the prior coordinate plot is not necessary for practicing the present invention and that the thermal colors may be represented on a Cartesian plot or no plot at all. Finally, for the clinician's reference, it should be noted that the plot illustrated in FIG. 6 shows a simplified form of Applicant's implemented embodiments since colors are referenced using an 8-bit index, and many more colors are present on an actual display than are illustrated. It can be appreciated by one skilled in the art that any number of colors may be shown with any length of index and that a specific choice would be left to a designer of such a system.

Thus, a method and apparatus for performing angiography using an ultrasonic imaging system has been described. Although the present invention has been described particularly with reference to many specific embodiments for a complete understanding of the present invention, as illustrated in FIGS. 1–6, it can be appreciated by one skilled in the an that the present invention may be practiced without many of these specific details. The detailed description is to be viewed in an illustrative sense, and the present invention is only to be construed as limited by the appended claims which follow.

What is claimed is:

1. In an ultrasonic imaging apparatus comprising an ultrasonic emitter, a receiver, a processor, and a display, a method for performing angiography of a subject under examination comprising the following steps:

a. using said ultrasonic emitter, emitting a set of ultrasonic reference pulses along each of a series of parallel vectors in said subject under examination;

b. using said receiver, receiving each of a plurality of echo signals generated by a reflection of said ultrasonic reference pulses in said subject under examination;

c. for each of said plurality of received echo signals, obtaining a plurality of data samples from said plurality of received echo signals, each of said data samples representing points along each of said series of parallel vectors in said subject, said plurality of data samples each including a frequency shift from each of said set of ultrasonic reference pulses;

d. successively removing from each of said plurality of data samples a plurality of basis functions to remove clutter from said plurality of data samples and generate a plurality of averaged processed signals;

e. temporally filtering each of said plurality of averaged processed signals with each of a plurality of signals which have been displayed in a previous time period to generate a plurality of second signals, said temporal filtering using a filter which is approximates a full cardiac cycle of said subject under examination;

f. converting each of said second plurality of signals to a color value to generate a first plurality of color values, each said color value of said first plurality of color values within a range of color values from said first color value to a second color value, wherein said first color value represents a minimum amplitude of said second plurality of signals to be displayed and said second color value represents a maximum amplitude of said second plurality of signals to be displayed; and g. displaying said first plurality of color values on said display at positions on said display corresponding with said points along each of said series of parallel vectors in said subject.

2. The method of claim 1 further comprising the step of displaying said first color on a polar coordinate scale at an origin of said polar coordinate scale, and displaying said second color value at a maximum radius on said polar coordinate scale, and displaying said range of color values from said first color value to said second color value at intermediate positions on said polar coordinate scale between said origin and said maximum radius.

3. The method of claim 1 wherein said first color is blue and said second color is yellow.

4. The method of claim 1 wherein said displaying of said fast plurality of color values further includes superimposing said first plurality of color values upon a B-scan image of said subject under examination.

5. The method of claim 4 wherein said superimposing step further includes replacing each of said first plurality of color values which are equivalent to said first color with pixel values obtained from said B-scan image.

6. The method of claim 1 wherein said temporal filtering of said plurality of averaged signals ($x_n$) with each of a plurality of signals which have been displayed in a previous time period ($y_{n-1}$) to generate a plurality of second averaged signals $y_n$ comprises forming $y_n = \alpha y_{n-1} + (1-\alpha)x_n$ wherein $\alpha$ is determined based upon the larger of either $x_n$ or $y_{n-1}$.

7. The method of claim 1 wherein said displaying of said first plurality of color values further includes superimposing said first plurality of color values upon a B-scan and Doppler image of said subject under examination.

* * * * *